Oct. 4, 1932.  E. H. COOPER  1,880,823
DISPENSING DEVICE
Filed Sept. 15, 1930
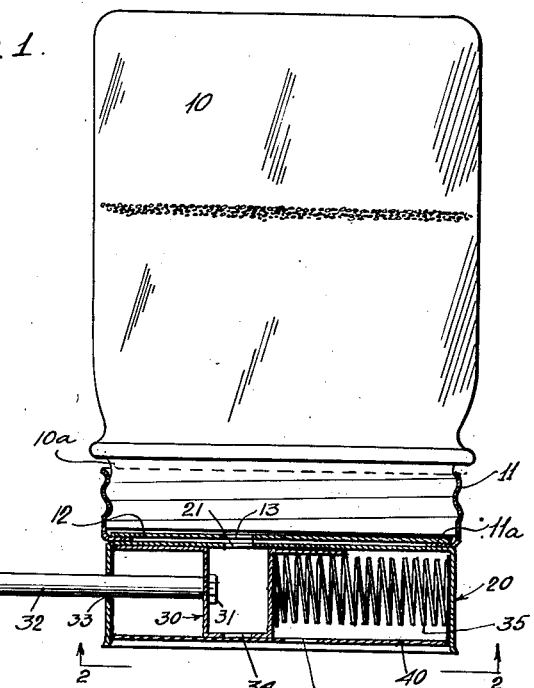
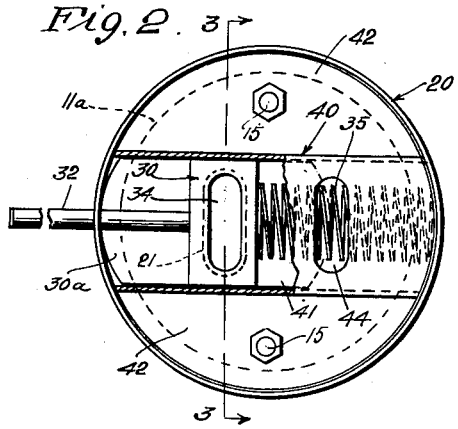
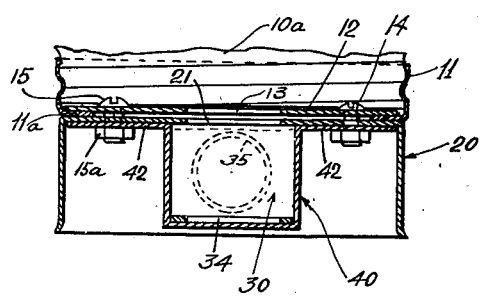
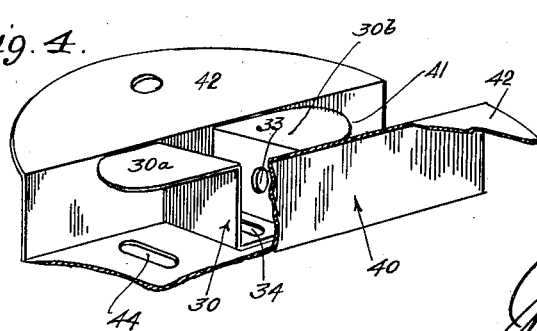
Inventor
Edwin H. Cooper.
Attorney.

Patented Oct. 4, 1932

1,880,823

UNITED STATES PATENT OFFICE

EDWIN H. COOPER, OF LOS ANGELES, CALIFORNIA, ASSIGNOR TO LOS ANGELES SOAP COMPANY, OF LOS ANGELES, CALIFORNIA, A CORPORATION OF CALIFORNIA

DISPENSING DEVICE

Application filed September 15, 1930. Serial No. 481,971.

My invention has to do with dispensing devices, and more particularly with devices for dispensing pulverized materials from containers.

It is an object of my invention to provide such a device as will efficiently dispense a measured quantity of pulverized material and be automatically returned to material receiving position; and at the same time a device which, by virtue of simplicity of design, and construction, is extremely simple of operation and economical to manufacture and assemble. It is also an object to provide a device such as can be attached to a standard container—such as a "Mason" jar. Other objects and accomplishments will become obvious from the following detailed description of a specific structure embodying my invention, for which purpose reference will be made to the accompanying drawing, in which:

Fig. 1 is a sectional elevation showing my device in normal or material receiving position and attached to a material container;

Fig. 2 is a bottom view of Fig. 1, with parts broken away to disclose the measuring cup;

Fig. 3 is a sectional elevation on line 3—3 of Fig. 2; and

Fig. 4 is a perspective view disclosing the association of the measuring cup with the trough in which it is mounted.

The numeral 10 designates a material container adapted to contain a pulverized material. For this element I prefer and illustrate a standard "Mason" jar having a circular screw-threaded neck 10a, on which my device is mounted, as by being screwed thereon.

For mounting my dispenser upon the container, I provide a threaded ring 11 having an annular flange 11a overhanging the mouth of the container. When a standard Mason jar is employed as the container, the threaded ring, comprising a part of the standard equipment of such a jar (normally used for clamping the cover cap in place), may be utilized as my ring 11; since such a standard jar cover clamping ring presents an annular flange as shown at 11a. A circular disk 12 is confined between the annular flange and container mouth, upon which disk are supported the elements to be hereinafter described. I employ disk 12 merely for the purpose of adapting a standard jar cover clamping ring for use as my ring 11—such a provision being necessary since a standard jar cover clamping ring contains no bolt or screw holes for mounting the remaining elements of my device. I wish it understood, however, that disk 12 may be dispensed with, in which case the said dispensing elements may be mounted by being bolted, screwed or otherwise fastened to flange 11a or the ring 11. An opening 13 is provided through disk 12, through which material may pass to fill the measuring cup element to be described; and two bolt holes 14 are also provided in disk 12 to take mounting bolts 15. Where, however, the disk 12 is not utilized, holes 14 may be provided in annular flange 11a.

Secured to disk 12, by means of bolts 15, is a body comprised of an inverted circular cup-shaped body member 20 and a U-shaped trough member 40, in which a measuring cup 30 is slidably mounted. The inverted cup body 20 has in its top portion an aperture 21 which registers with disk aperture 13, and the side walls of the cup extend downwardly to a point preferably slightly below the plane of the bottom of trough member 40. By thus surrounding the dispensing elements, the cup walls serve as a guard and protection therefor. In the event the disk is omitted from the structure, aperture 21 communicates directly with the interior of container 10.

Measuring cup 30 is formed of a piece of sheet metal bent to U-shape and has secured to it, as by a nut 31, an operating push-pin 32. The end of the push-pin opposite the end which is secured to the measuring cup projects through an opening 33 in the vertical side wall of body 20 so that the pin may be manually operated to effect the movement of the cup 30 to be described. The open upper side of the U-shaped measuring cup 30 normally stands in register with apertures 13 and 21 to receive a measured charge of material to be dispensed; and the measuring cup has an outlet 34 in its bottom portion through which the material is finally discharged when the cup is moved, by means of push pin 32, to discharge position. A coil spring 35, which seats at one end against the vertical side wall of body 20 and at its other end against measuring cup 30, normally urges the cup 30 to material receiving position (which I shall call the normal position) and automatically returns said cup to that position after the dispensing action has been completed.

U-shaped trough member 40, which forms the trough 41 in which the dispensing or measuring cup 30 slides longitudinally, is provided for retaining the measuring cup and spring 35 in position, and for providing a trough along which the dispensing or measuring cup 30 slides from normal to dispensing position; and for providing the side walls of the measuring chamber, of which the U-shaped measuring cup 30 forms the end and bottom walls. This trough member is secured to the body by means of bolts 15 passing through flanges 42, on opposite sides of trough 41, nuts 15a being screwed onto the bolts to secure the mounting of the various elements through which the bolts pass. The bolts secure together the parts 12, 20 and 42 and clamp the flange 11a between parts 12 and 20.

Measuring cup 30 has flanges 30a and 30b on its ends, which flanges serve as stop members to arrest longitudinal movement of the cup in trough 41—flange 30b stopping movement of the cup so that it will be in register with inlet openings 13 and 21, and flange 30a stopping its movement when it has reached its discharge position in register with discharge opening 44. These flanges also function as guide members for the dispenser elements sliding movement along the trough.

While I have described measuring element 30 as a "cup", when considered by itself its two sides are open, as will appear more clearly in Fig. 4. Side walls or closures are therefore provided for cup 30 by the vertical side walls of trough 41. By providing a snug but slidable fit of cup 30 in trough 41, said side walls of the trough form effective closures for the sides of the cup, which feature is advantageous.

By reference to the foregoing description, it will be observed that the operation of my device is as follows: When in normal position (see Figs. 1 and 2) measuring cup 30 is filled with material through apertures 13 and 21. Then, by manually pushing pin 32 inwardly of the body, cup 30 is moved along trough 41 until the discharge opening 34 registers with outlet 44 in the bottom of trough 41, and when the device reaches that position, the measured material carried in the cup passes out through openings 34 and 44. In this position the cup is out of register with opening 21, which is at that time closed by cup flange 30b. The dispensing or measuring cup is returned to normal position by the action of spring 35.

In some aspects the trough member 40, with its trough 41, may be looked upon as forming a part of the body 20; being only for convenience of manufacture formed as a separate piece. And the same observations apply to the screw ring 11 and body 20. The inverted cup shape of body 20 provides a convenient base on which the whole device can be stood when not in use.

While, for the purposes of describing a particular embodiment of my invention, I have resorted to certain details of construction and arrangement, I wish it understood that the gist of my invention is not to be so confined, but is only to be limited as set forth in the appended claims.

I claim:

1. A dispensing device of the character described comprising, in combination with a material container having an outlet: a body comprising an inverted cup-shaped member and a trough-shaped member having vertical side walls; an inlet in the top of the inverted cup member communicating with the container outlet, and an outlet opening in the bottom of the trough; a U-shaped measuring element, having open sides, slidably mounted in the trough and normally communicating at its open upper side with the inlet opening to receive a measured charge of material, the vertical side walls of said trough forming side closures for the measuring element; an outlet in the bottom of said measuring element adapted to register with and to discharge material through the outlet in the bottom of the trough when moved to register therewith, and means to move said measuring element to and from discharging position.

2. A dispensing device of the character described comprising, in combination with a material container having an outlet: a body comprising an inverted cup-shaped member and a trough-shaped member having vertical side walls; an inlet in the top of the inverted cup member communicating with the container outlet, and an outlet opening in the bottom of the trough; a U-shaped measuring element, having open sides, slidably mounted in the trough and normally communicating at its open upper side with the inlet opening to receive a measured charge of material, the vertical side walls of said trough forming side closures for the measuring element; an outlet in the bottom of said measuring element adapted to register with and to discharge material through the outlet in the bottom of the trough when moved to register therewith; means to manually move said dispensing element from normal to discharging position, spring means to return same to normal position, and stop members on the dispenser element to arrest sliding movement thereof in the bottom body member.

3. A dispensing device of the character described comprising, in combination with a material container having an outlet: a body comprising an inverted cup-shaped member and a trough-shaped member having vertical side walls; an inlet in the top of the inverted cup member communicating with the container outlet, and an outlet opening in the bottom of the trough; a U-shaped measuring element, having open sides, slidably mounted in the trough and normally communicating at its open upper side with the inlet opening to receive a measured charge of material, the vertical side walls of said trough forming side closures for the measuring element; an outlet in the bottom of said measuring element adapted to register with and to discharge material through the outlet in the bottom of the trough when moved to register therewith; means for closing the body inlet while said measuring element is out of communication therewith; a push-pin connected to the measuring element and projecting through the body for manually moving the measuring element to discharging position and spring means opposing said movement of the dispensing element.

4. A dispensing device of the character described comprising, in combination with a material container having a threaded circular mouth: a threaded mounting ring adapted to be screwed onto said mouth and having an annular flange overhanging the mouth; means on said flange for securing thereto a body, said body comprising an inverted cup-shaped member and a trough-shaped member having vertical side-walls; an inlet opening in the top of said body member communicating with the container mouth and an outlet opening in the trough member; a U-shaped measuring element, having open side portions, slidable longitudinally in the trough and normally communicating with the inlet opening in the body member to receive a measured charge of material, the vertical side walls of said trough forming side closures for the measuring element; an outlet in the bottom of the measuring element adapted to register with and to discharge material through the outlet in the trough; a push-pin connected to the measuring element and projecting through the body adapted for manually moving the measuring element to discharging position, and spring means opposing said movement of the measuring element.

5. A dispensing device of the character described comprising, in combination with a material container having an outlet: a body comprising an inverted cup-shaped member having a vertical side wall, a trough-shaped member having vertical side walls, said trough-shaped member being secured to the cup-shaped member and within the side wall thereof; an inlet in the top of the inverted cup-shaped member communicating with the container outlet, and an outlet opening in the bottom of the trough-shaped member; a U-shaped measuring element, having open side portions and flanged end walls; slidably mounted in the trough-shaped member and normally communicating at its open upper side with the inlet opening of the inverted cup-shaped member to receive a measured charge of material, the vertical side walls of said trough-shaped member forming side closures for the measuring element; an outlet in the bottom of said measuring element adapted to register with and discharge material through the outlet in the bottom of the trough-shaped member when moved to register therewith, the flange on one end of the measuring element being adapted to contact with the side wall of the inverted cup-shaped member to arrest sliding movement of the measuring element in a position of communication with the inlet in the top of the inverted cup-shaped member and the flange on the other end of the measuring element being adapted to contact with the opposite side wall of the inverted cup-shaped member to arrest sliding movement of the measuring element in a position of communication with the outlet opening in the bottom of the trough-shaped member, and means to move said measuring element to and from discharge position.

6. A dispensing device of the character described, comprising: a body adapted to fit on a container mouth, said body having a trough-shaped portion and an opening communicating between the container and trough, said trough having an outlet opening; a measuring cup slidably mounted in the trough and having opposite open sides closed by the adjacent side walls of the trough, said measuring cup having an open top portion which normally communicates with the body inlet and a discharge opening adapted to communicate with the trough outlet when the measuring cup is moved along the trough, and means to move said measuring cup along said trough.

7. A dispensing device of the character described, comprising: a body adapted to fit on a container mouth, said body having a trough-shaped portion and an opening communicating between the container and trough, an outlet opening through the bottom of the trough; a measuring cup slidably mounted in the trough and having opposite open sides closed by the adjacent side walls of the trough, said measuring cup having an open top portion which normally communicates with the body inlet and a discharge opening adapted to communicate with the trough outlet when the measuring cup is moved along the trough; means for manually moving said measuring cup along the trough to a position where its discharge opening will communicate with the trough outlet and spring means for returning said cup to its normal position of communication with the body inlet.

8. A dispensing device of the character described, comprising: a body adapted to fit on a container mouth, said body having a trough-shaped portion and an opening communicating between the container and trough, said trough having an outlet opening; a U-shaped measuring cup slidably mounted in the trough and having opposite open sides and flanged end portions, said open sides being closed by the ajacent side walls of the trough, said cup member having an open top portion which normally communicates with the body inlet and a discharge opening adapted to communicate with the trough outlet when the cup is moved along the trough, one of the flanged end portions of the cup member acting to close the body inlet when the open top portion of the cup member is out of communication with the body inlet; and means for moving said measuring cup along said trough.

In witness that I claim the foregoing I have hereunto subscribed my name this 3rd day of September 1930.

EDWIN H. COOPER.